United States Patent
Ning et al.

(10) Patent No.: US 10,224,150 B2
(45) Date of Patent: Mar. 5, 2019

(54) SOLID ELECTROLYTIC CAPACITOR WITH ENHANCED HUMIDITY RESISTANCE AND METHOD FOR PRODUCING THE SAME

(71) Applicant: KEMET Electronics Corporation, Simpsonville, SC (US)

(72) Inventors: Liancai Ning, Jiangsu (CN); Qun Ya, Jiangsu (CN)

(73) Assignee: KEMET Electronics Corporation, Simpsonville, SC (US)

(*) Notice: Subject to any disclaimer, the term of this patent is extended or adjusted under 35 U.S.C. 154(b) by 71 days.

(21) Appl. No.: 15/013,171

(22) Filed: Feb. 2, 2016

(65) Prior Publication Data

US 2017/0221637 A1    Aug. 3, 2017

(51) Int. Cl.
| | |
|---|---|
| *H01G 9/15* | (2006.01) |
| *H01G 9/042* | (2006.01) |
| *H01G 9/07* | (2006.01) |
| *H01G 9/00* | (2006.01) |
| *C23C 2/00* | (2006.01) |
| *H01G 9/012* | (2006.01) |
| *H01G 9/028* | (2006.01) |

(52) U.S. Cl.
CPC .......... *H01G 9/0425* (2013.01); *C23C 2/00* (2013.01); *H01G 9/0032* (2013.01); *H01G 9/0036* (2013.01); *H01G 9/012* (2013.01); *H01G 9/028* (2013.01); *H01G 9/07* (2013.01); *H01G 9/15* (2013.01)

(58) Field of Classification Search
CPC  H01G 9/04; H01G 9/15; H01G 9/048; H01G 9/145; H01G 9/0252
See application file for complete search history.

(56) References Cited

U.S. PATENT DOCUMENTS

| | | | | |
|---|---|---|---|---|
| 4,203,194 A | * | 5/1980 | McGrath | H01G 9/0029 29/25.03 |
| 5,117,332 A | * | 5/1992 | Kudoh | H01G 9/02 205/188 |
| 5,938,797 A | | 8/1999 | Fujiwara et al. | |
| 6,128,180 A | * | 10/2000 | Araki | H01G 9/15 361/524 |
| 6,556,427 B2 | | 4/2003 | Ohata et al. | |
| 7,154,742 B1 | * | 12/2006 | Hahn | H01G 9/048 361/528 |
| 7,483,259 B2 | | 1/2009 | Biler | |
| 8,848,342 B2 | | 9/2014 | Uher et al. | |
| 2008/0291606 A1 | * | 11/2008 | Takahashi | H01G 9/08 361/535 |
| 2009/0086413 A1 | * | 4/2009 | Takatani | H01G 9/025 361/523 |
| 2010/0271757 A1 | * | 10/2010 | Ishikawa | H01G 9/0036 361/525 |
| 2010/0296227 A1 | * | 11/2010 | Chacko | H01G 9/012 361/523 |
| 2012/0250227 A1 | * | 10/2012 | Mitsuyama | H01G 9/0032 361/529 |
| 2013/0050904 A1 | * | 2/2013 | Nemoto | H01G 9/04 361/528 |

* cited by examiner

*Primary Examiner* — Nguyen T Ha
(74) *Attorney, Agent, or Firm* — Joseph T. Guy; Patent Filing Specialist, Inc.

(57) ABSTRACT

An improved capacitor is provided. The capacitor comprises an anode and a functional dielectric on said anode and a conductive layer on the functional dielectric. An anode wire extends from said anode wherein the anode wire has a thickened dielectric layer thereon.

28 Claims, 3 Drawing Sheets

Figure 1:
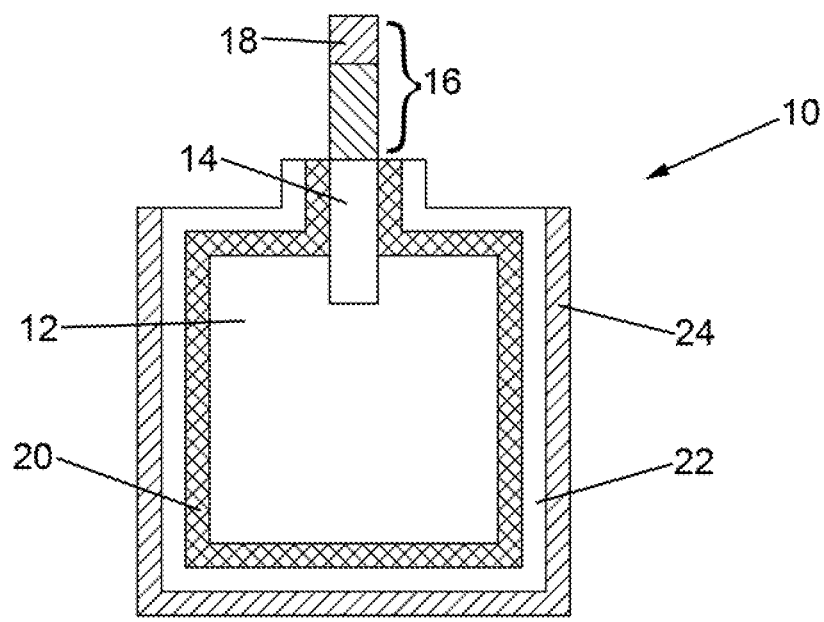

SOLID ELECTROLYTIC CAPACITOR WITH ENHANCED HUMIDITY RESISTANCE AND METHOD FOR PRODUCING THE SAME

BACKGROUND

The present invention is related to a solid electrolytic capacitor with high humidity resistance. More specifically, the present invention is related to a solid electrolytic capacitor with reduced leakage current under high humidity and high temperature test conditions. The present invention is also related to a method for producing the solid electrolytic capacitor.

A solid electrolytic capacitor typically comprises a porous pressed pellet of sintered powder as the anode with a wire inserted into the powder or attached to the pressed powder. An oxide layer is formed on the surface of the pellet as the dielectric. A conductor, typically an electrically conductive polymer, functions as the cathode wherein the conductor impregnates the pores of the pellet such that dielectric is between the polymer and anode. External connections, such as carbon paint, silver paint, etc., allow a negative lead, to be placed in electrical contact with the conductive polymer such as by a conductive adhesive. The wire is welded to an anode termination as the positive lead of the capacitor. The construction of a solid electrolytic capacitor with electrically conductive polymer is well known to those of skill in the art and further discussion of the general structure is not necessary.

The electrically conductive polymer, typically selected from polyaniline, polypyrrole, polythiophene, and their derivatives, provides the advantage of low equivalent series resistance (ESR) and, unlike manganese dioxide, the failure mode does not include burning or ignition. The conductive polymer layer is typically applied by either an in situ process, wherein monomer is chemically or electrochemical polymerized, or by a coating process wherein pre-formed conductive polymer is applied in the form of a dispersion.

In the process of manufacturing solid electrolytic capacitors, anodized anodes are processed through multiple dipping cycles wherein conductive polymer, and other components, is deposited onto the dielectric surface via either the in-situ process or the dispersion process. Typically, a hydrophobic insulated coating material is coated on the wire to electrically isolate the positive anode and negative cathode of the solid capacitor. The hydrophobic characteristic of the coating material inhibits chemical solution from climbing, or wicking, up the wire. It is preferable to remove portions of the coating material, and any oxide on the surface of the wire, in the region of anode termination attachment to insure an adequate solder bond. The coating material and dielectric layer is typically removed by a mechanical method or a laser method to expose the metal of the wire thereby enhancing the welding strength between the wire and anode termination. The distance between the conductive polymer, as the negative electrode of the capacitor, and the exposed metal portion of the wire, as the positive electrode of the capacitor, is unfortunately limited by manufacturing limitations. Under harsh application conditions, such as high temperature and high relative humidity, there could be by-pass conduction between the conductive polymer and the exposed tantalum metal leading to increases in leakage current and, in extreme conditions, a direct electrical short. By-pass conduction as used herein refers to a conduction path around the functional dielectric.

To mitigate these issues the humidity resistance of solid electrolytic capacitors has been improved by different approaches in the art. U.S. Pat. Nos. 6,556,427 and 5,938,797, for example, describe different methods of manufacturing a solid electrolytic capacitor by improving the adhesion property between the solid electrolyte and the carbon or graphite paint layers applied thereon. U.S. Pat. No. 8,848,342 describes a method for overcoming the problem of conductive polymer layer delamination by carefully controlling the conductive polymer coating configuration and manner of deposition. U.S. Pat. No. 7,483,259 describes a method of overlaying a barrier layer with a three-dimensional cross-linked network on the solid electrolyte surface to improve adhesion. The improved methods of humidity resistance described above only solve the leakage current across the dielectric layer and do not mitigate the conductive path by-passing, or circumventing, the dielectric.

In spite of the advances in the art there is still a significant need to reduce, and preferably eliminate, the leakage current occurring from current by-passing, or circumventing, the dielectric. The present invention addresses this previously untreated mechanism of leakage current thereby mitigating a potential failure mode of a capacitor and increasing the reliability under harsh conditions such as high temperature and high relative humidity.

SUMMARY OF THE INVENTION

It is an object of the invention to provide a solid electrolytic capacitor with enhanced humidity resistance.

It is another object of the invention to provide an improved method for producing a solid electrolytic capacitor by localized formation of a thickened dielectric layer on the exposed metal area of the anode wire of a capacitor.

It is another object of the invention to provide an improved method for forming a dielectric layer on the anode wire, by localized dielectric formation, wherein the dielectric thickness on the wire is thicker than the functional dielectric of the anode body.

It is another object of the invention to provide an improved method for forming a blocking polymer on the anode wire wherein the blocking polymer is less conductive than the polymer functioning as the cathode on the anode body.

These and other advantages, as will be realized, are provided in a capacitor comprising and an anode and a functional dielectric on said anode and a conductive layer on the functional dielectric. An anode wire extends from said anode wherein the anode wire has a thickened dielectric layer thereon.

Yet another embodiment is provided in a method for forming a capacitor comprising:
pressing and sintering a metal to form an anode with an anode wire extending therefrom;
forming a functional dielectric on the anode;
forming a conductive layer on the functional dielectric; and
forming a thickened dielectric layer on the anode wire.

FIGURES

FIG. 1 schematically illustrates in cross-sectional view a capacitor before localized dielectric formation.

Figure 2:
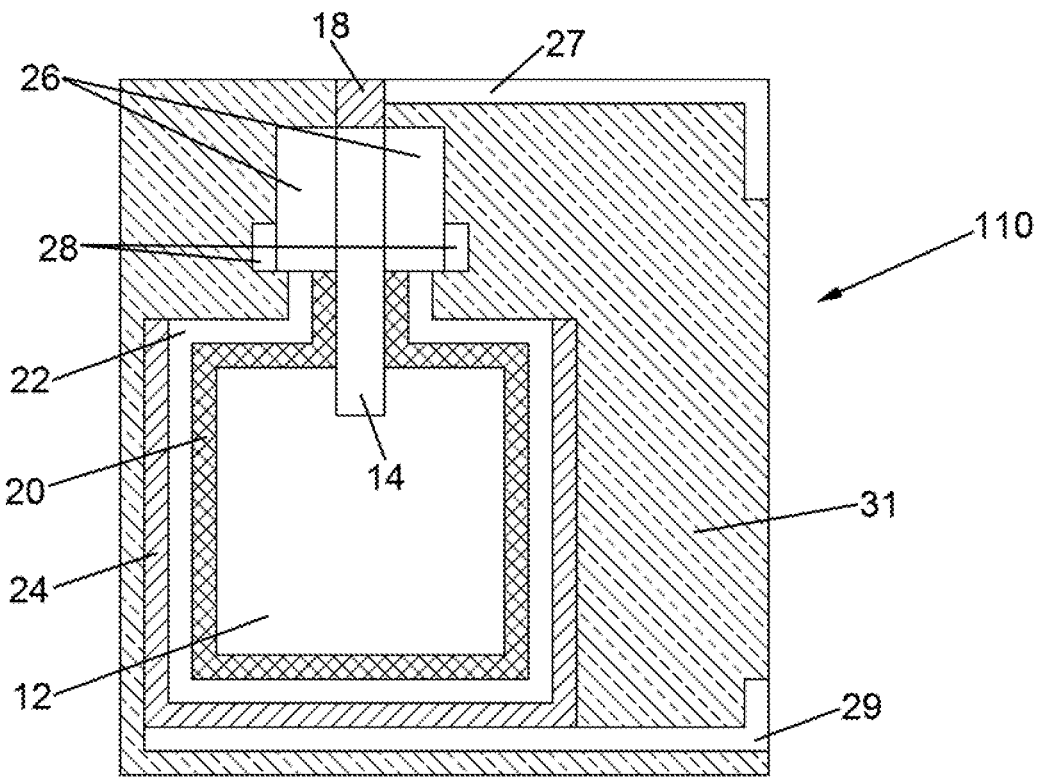

FIG. 2 schematically illustrates in cross-sectional view a capacitor after localized dielectric formation.

Figure 3:
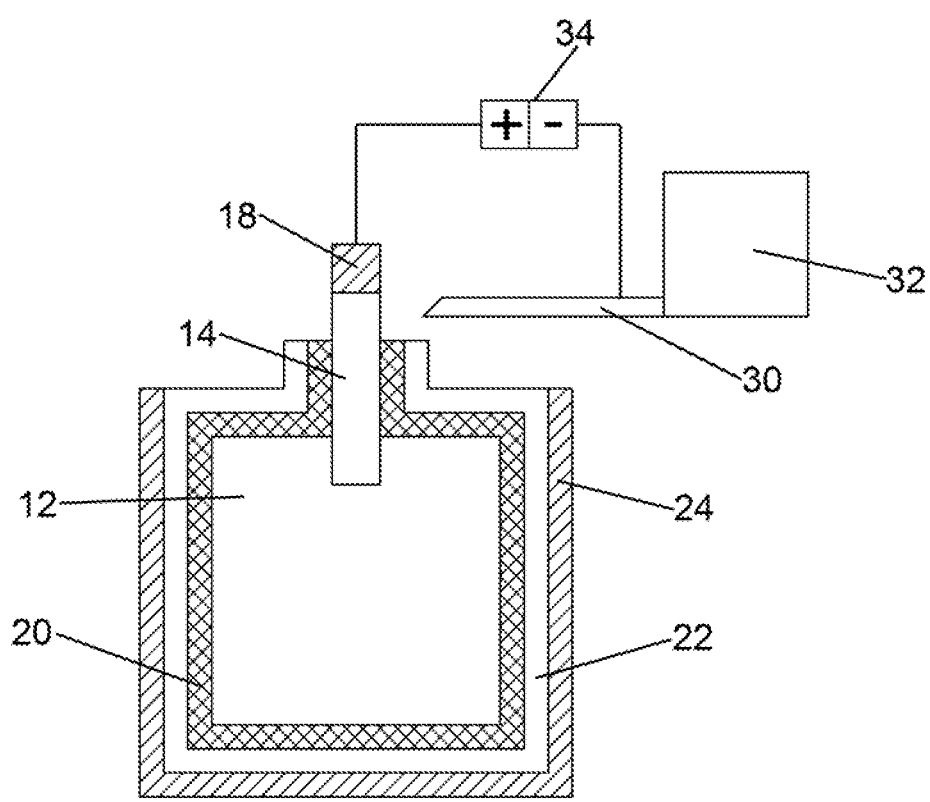

FIG. 3 schematically illustrates in cross-sectional view an apparatus and method for localized dielectric formation.

Figure 4:
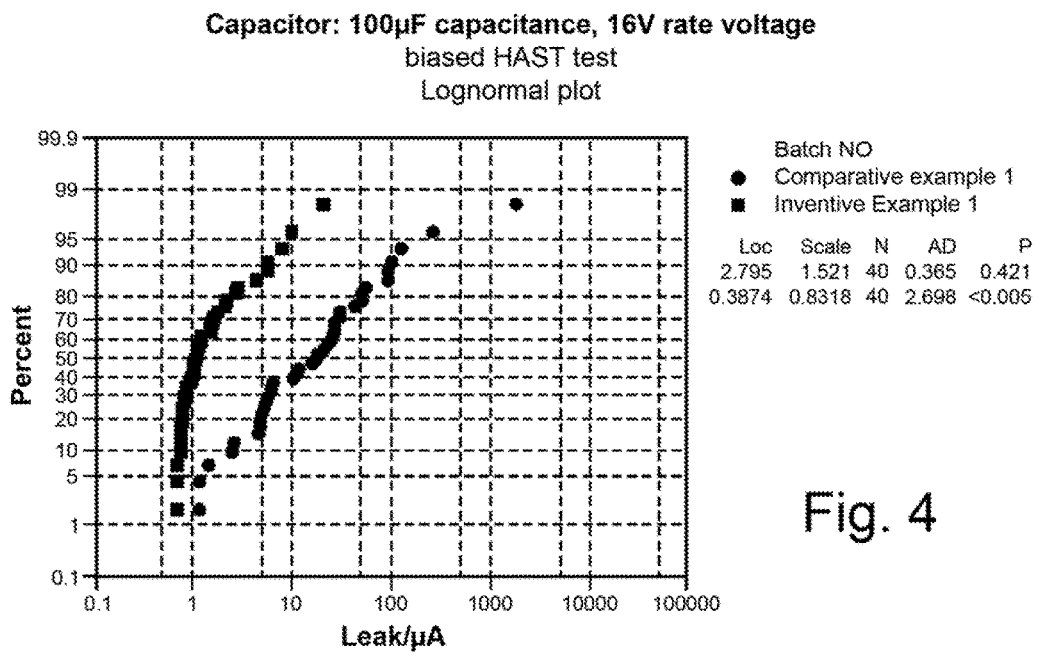

FIG. 4 graphically illustrates a leakage current comparison between the inventive group and a comparative group in biased Highly Accelerated Life Test (HAST).

Figure 5:
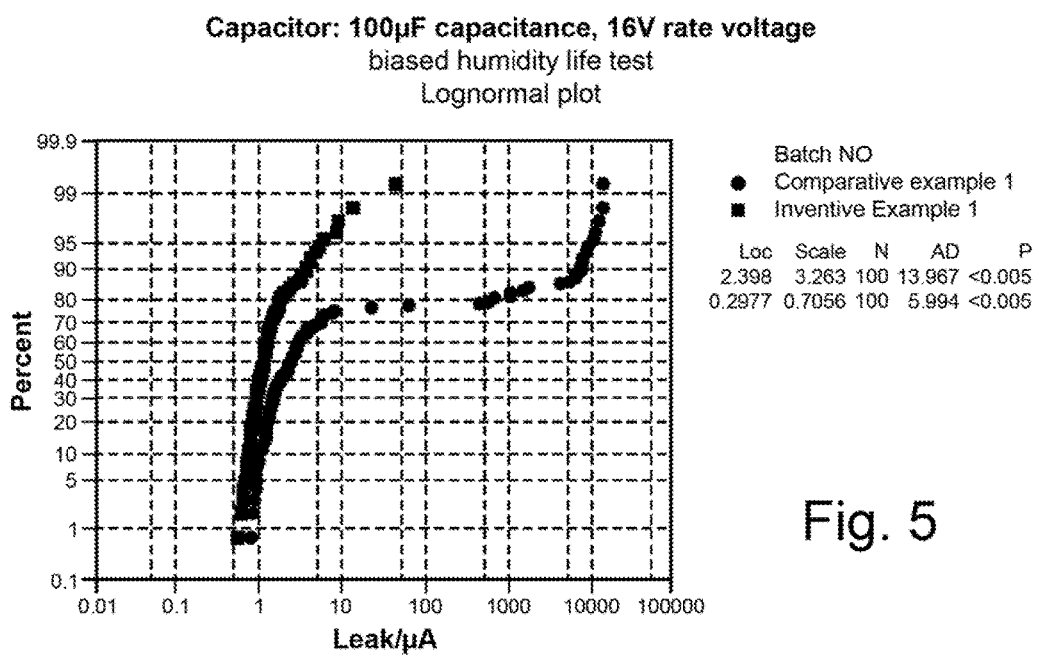

FIG. 5 graphically illustrates a leakage current comparison between an inventive group and a comparative group in biased humidity life testing.

DESCRIPTION

The instant invention is specific to a capacitor with improved humidity resistance. More specifically, the present invention is specific to an improved capacitor, and a method for making the improved capacitor, comprising a thickened dielectric layer on the anode wire and preferably a blocking polymer layer thereon.

In the process for forming a capacitor a porous pellet is prepared, for example, by pressing and sintering a powder to form a porous body. Preparation of porous sintered pellets is well known in the art as taught, for example, in U.S. Pat. No. 5,729,428 to Sakata et al. which is incorporated herein by reference in its entirety. The pellet may be made from any suitable conductive material and preferably a valve metal such as tantalum, aluminum, niobium, titanium, zirconium, hafnium, alloys of these elements, or a conductive oxide thereof such as NbO. Tantalum is a preferred anode material.

A metal wire, or anode wire, functions as a current collector for the anode and the wire may be inserted into the pellet before pressing such that the particles are molded together with the metal wire. Alternatively, the metal wire can be attached to the pellet such as by welding. The anode wire may be made from any suitable material such as tantalum, aluminum, niobium, titanium, zirconium, hafnium, alloys of these elements or conductive oxides thereof such as NbO. Tantalum is a preferred material.

An oxide film is formed on the sintered pellet. The oxide film may be formed using any suitable electrolyte solution, referred to as a forming electrolyte, such as a phosphoric acid or a phosphate-containing solution. A voltage of from about 9 V to about 250 V is commonly applied. The formation voltage typically ranges from 2.0 to 3.5 times the rated voltage of the capacitor.

An insulated, preferably hydrophobic, coating material is preferably coated on the anode wire to inhibit wicking of solution up the wire. The coating material may comprise organic polymeric siloxane, organic polymeric fluoride, or polyimide. The organic polyimide material is preferred. The coating methods include dip coating, spray coating, brush coating, roller coating, and the like. Preferably, the coating method is brush coating. The hydrophobic characteristic of the coating material is capable of prevents the chemical solution from climbing or wicking up the wire.

After the coating material is applied a conductive layer is formed on the dielectric preferably by immersing the pellet in a series of impregnating solutions. The impregnating solutions preferably contain monomer, oxidizing agent, dopant and other adjuvants as known to those of skill in the art. The selection of a suitable solvent for the solution is well within the level of skill in the art. Examples of suitable solvents include ketones and alcohols such as acetone, pyridine, tetrahydrofuran, methanol, ethanol, 2-propanol, and 1-butanol. A solvent of 1-butanol and 2-propanol mixed at a ratio of from about 1:15 to about 1:21 is particularly suitable for demonstration of the invention. The monomer concentration may be from about 1.5 wt. % to about 8 wt. %, more preferably from about 4 wt. % to about 8 wt. % for demonstration of the invention. Suitable monomers for preparing conductive polymers include but are not limited to aniline, pyrrole, thiophene, and derivatives thereof. Monomers for preparing conductive polymers are well known in the art as taught, for example, in U.S. Pat. No. 4,910,645 to Jonas et al. which is incorporated herein by reference in its entirety. A preferred monomer is 3,4-ethylenedioxythiophene. The oxidizing agent concentration may be from about 6 wt. % to about 45 wt. % and more preferably from about 16 wt. % to about 42 wt. % for demonstration of the invention. Oxidizing agents for preparing conductive polymers are well known in the art as taught, for example, in U.S. Pat. No. 4,910,645, which is incorporated herein by reference, wherein various oxidants for the polymerization of thiophenes and pyrroles are described including Fe(III) salts of organic and inorganic acids, alkali metal persulfates, ammonium persulfate, and others. A preferred oxidant for demonstration of the invention is Fe(III) tosylate. The dopant concentration may be from about 5 wt. % to about 30 wt. % and more preferably from about 12 wt. % to about 25 wt. %. Any suitable dopant may be used, such as dodecyl benzenesulfonate, p-tosylate, or chloride. The preferred dopant is p-tosylate. The pellets are cured at a temperature of from 65° C. to about 160° C. and more preferably from about 80° C. to about 120° C. thereby allowing the monomer to polymerize. Curing is preferably followed by washing in deionized water or another solvent. This dipping-cure-washing process is repeated 3-8 times to build up enough conductive polymer on the anode surface. The possibility of conductive polymer growing on the metal wire is high even though the coating material is applied before multiple chemical dipping-cure-washing processes.

It is known in the art that adhesion of a lead frame to a conductive polymer layer is difficult. This has lead to the common use of a series of layers intended to increase adhesion. The adhesion layers, which may be considered part of the cathode, preferably include a conductive carbon containing layer, which adheres to the conductive polymer, and a conductive metal layer, which adheres to the conductive carbon layer. The lead can be attached to the conductive metal layer by a conductive adhesive or by welding.

A conductive carbon layer is formed on the conductive polymer layer, preferably, by application of a carbon paste layer comprising conductive carbon, such as carbon black or graphite, in a binder. The binder can include, for example, polyacrylic acid-based polymer, polyvinyl alcohol, cellulose ester, polyacrylamide, methyl cellulose, or the like, with polyacrylic acid-based polymer being a preferred binder.

After the carbon layer is applied, a metal paste layer containing metal particles and a binder resin is applied. Silver and nickel are preferred metals. The binder resin is not particular limited, but can be implemented by, for example, an ester-based polymer, an imide-based polymer, an epoxy-based polymer or the like. The ester-based polymer is preferred. The metal layer may also be an electroplated metal layer preferably formed by reverse bias. The electroplated metal is preferably nickel or silver with nickel being a preferred plated metal.

After the silver layer is applied, the anode wire is welded to an anode termination and the silver layer is connected to a cathode termination preferably by a conductive adhesive. The coating material and conductive polymer on the metal wire is removed before welding by a mechanical method or a laser method around the welding area to enhance the welding strength between the anode wire and the positive termination. After the anode wire is cleaned a thickened dielectric area is formed locally on the anode wire and a blocking polymer layer is preferably formed thereon as set forth further herein.

The invention will be described with reference to the various figures forming an integral non-limiting component of the disclosure. Throughout the disclosure similar elements will be numbered accordingly.

An embodiment of the invention will be described with reference to FIG. 1 wherein a capacitor is schematically illustrated in cross-sectional view prior to formation of the localized thickened dielectric on the anode wire. In FIG. 1, a capacitor, generally represented at 10, comprises an anode, 12, typically in the form of a pressed pellet as described elsewhere herein. An anode wire, 14, extends from the anode wherein the anode wire comprises a cleaning area, 16, which is that portion to be subsequently cleaned, and a welding area, 18, which is preferably a clean metal with neither dielectric nor coating thereon. Though the cleaning area and welding area are indicated as well defined areas of demarcation, in practice there is a gradient of surface concentration of coating and oxide which may extend through the area defined herein as a welding area. To insure an adequate welding area a much larger area then actually needed is cleaned. A dielectric layer, 20, encases the anode and a portion of the wire. The dielectric area is preferably an oxide of the anode. A conductive polymer layer, 22, encases up to the entire dielectric and functions as the cathode with the proviso that the conductive polymer layer does not come into direct contact with the anode since this would represent an electrical short. As would be realized from the discussion herein the current by-pass distance is the closest approach distance between the anode, or anode wire, and cathode. The anode and cathode, separated by the dielectric, form the capacitive couple and therefore the dielectric with anode and cathode on either side thereof is referred to herein as a functional dielectric and the conductive polymer separated from the anode by dielectric is referred to herein as functional conductive polymer. An adhesion layer, 24, encases at least a portion of the conductive polymer layer. The adhesion layer preferably comprises multiple sub-layers to allow conductivity between a lead frame and the conductive polymer layer. The sub-layers preferably include carbon containing layers and metal containing layers with the carbon containing layers preferably between the conductive polymer layer and a metal containing layer.

An embodiment of the invention will be described with reference to FIG. 2 wherein a capacitor, generally represented at 110, is schematically illustrated in cross-sectional view after formation of the thickened dielectric region and blocking polymer layer. In FIG. 2 the anode, 12, dielectric, 20, conductive polymer layer, 22, and adhesion layer, 24, are as described relative to FIG. 1. The anode wire, 14, after cleaning, has formed thereon a thickened dielectric region, 26, wherein the dielectric in the thickened dielectric region is thicker than the function dielectric, represented by 20. More preferably the thickened electrode has a thickness which is 1.1-10.0 times the thickness of the functional dielectric. Even more preferably the thickened electrode has a thickness which is 2-8 times the thickness of the functional dielectric. A blocking polymer layer, 28, is formed on the thickened dielectric region wherein the blocking polymer layer is less conductive than the functional conductive polymer layer. In FIG. 2 the welding area, 18, is identified even though it is a continuation of the anode wire, 14, and only identified as the welding area for clarity of intended disposition. An anode lead, 27, is in electrical contact with the anode wire, preferably by welding, and a cathode lead, 29, is in electrical contact with the cathode, preferably by a conductive adhesive. The entire assembly, except for a portion of the anode lead and cathode lead, is preferably encased in a non-conductive resin, 31, as well known in the art.

Prior to formation of the thickened dielectric layer the coating material and polymer on the tantalum wire are cleaned by laser to enhance welding strength between the metal welding area and the positive termination. The risk of leakage current failure or short circuit is high between the cleaned area and the conductive polymer on the tantalum wire under harsh condition. The thickened dielectric, and blocking polymer layer, essentially seal the edge of the functional dielectric and functional conductive polymer thereby insuring that any current flowing between the anode and cathode is through either the functional dielectric or the thickened dielectric.

An embodiment of the invention will be illustrated in schematic cross-sectional view in FIG. 3 wherein the process for forming the thickened dielectric is illustrated by reference thereto. In FIG. 3, the anode, 12, dielectric, 20, conductive polymer layer, 22, and adhesion layer, 24, are as described above and the anode wire, 14, is illustrated after cleaning. The welding area, 18, is illustrated for reference as a continuation of the anode wire. In FIG. 3, a conductive nozzle, 30, such as a metal syringe, is in functional engagement with the cleaned anode wire, 14, at the proximity of intended formation of thickened dielectric. The conductive nozzle is supplied forming electrolyte from a feeder, 32, wherein the electrolyte may be the same electrolyte used to form the functional oxide or may be a different forming electrolyte. A power supply, 34, provides a voltage across the functional engagement of the conductive nozzle and anode wire and therefore, in the presence of electrolyte, causes formation of oxide at a voltage above the oxide formation voltage. The electrolyte solution is preferably expressed as a stream from the conductive nozzle under pressure wherein the stream contacts the tantalum wire. The pressure is sufficient to bath the wire in forming electrolyte. The negative and positive terminals of a power supply are connected to conductive nozzle and anode wire, respectively. As shown in FIG. 2, a thickened dielectric layer, thicker than the functional dielectric and adjacent the exposed metal area of the wire, is formed when the power supply outputs higher voltage than the anode's formation voltage. The conductive polymer is then formed adjacent to the exposed metal area of the wire thereby further electrically insulating the functional conductive polymer layer from the anode body.

EXAMPLES

The following illustrative examples are provided for a better understanding of the invention. These examples are illustrative of preferred aspects of the invention and are not intended to limit the scope of the invention.

Inventive Example 1

Tantalum powder with a charge of 70,000 CV/g was pressed and sintered to form a porous anode with a dimension of 0.84 mm thick, 3.25 mm wide and 4.69 mm long. A commercial polyimide material, identified as Upicoat, from UBE Industries Japan, was brushed on the tantalum wire and cured at 150° C. for 30 minutes. The anode was anodized in a phosphoric acid electrolyte to 50 V.

An impregnation solution containing 4 wt. % 3,4-ethylenedioxythiophene monomer, 16 wt. % Fe(III) p-tosylate oxidizer, 16 wt. % butanol with the balance being 2-propanol was prepared. A group of anodes were repetitively dipped in the impregnation solution and cured at 85° C. for 60 minutes. The anodes were washed in deionized water at room temperature and dried after each cure cycle. The anodes were processed through a series of 5 such steps.

Carbon paint and silver paint were coated on the exterior of the anodes. The coating material and conductive polymer were laser cleaned over that area of the tantalum wire intended to be welded to the positive termination. The exposed metal area of the tantalum wire was locally anodized in a phosphoric acid electrolyte to 100 V with a current of 5 A per anode to form the thickened dielectric on the anode wire. The tantalum wire was welding to a positive termination. A negative termination was connected to the silver paint layer by a conductive adhesive. The assembled body was encapsulated into epoxy resin to form a finished capacitor. The 100 µF, 16V rated capacitors were tested in both biased HAST test at 121° C., 85 RH % and 0.67 times rated voltage for 42 hours and biased humidity life test at 60° C., 90% RH for 500 hours. The results are shown in FIG. 4 and FIG. 5.

Comparative Example 1

Capacitors were prepared from the same anode lot as Inventive Example 1 except no localized anodization was applied therefore no thickened dielectric was formed. The capacitors were tested in both biased HAST test and biased humidity life test using the same conditions as for Inventive Example 1. The results are also shown in FIG. 4 and FIG. 5.

Inventive Example 2

Tantalum powder with a charge of 200,000 CV/g was pressed and sintered to form a porous anode of dimensions of 1.16 mm thick, 1.78 mm wide and 2.38 mm long. The same polyimide material was sprayed on the tantalum wire and cured at 150° C. for 30 mins. The anode was anodized in a phosphoric acid electrolyte to 18V.

An impregnation solution containing 4 wt. % 3,4-ethylenedioxythiophene monomer, 16 wt. % Fe(III) p-tosylate oxidizer, 16 wt. % butanol and the balance 2-propanol was prepared. A group of anodes was repetitively dipped in the impregnation solution and cured at 85° C. for 60 mins. The anodes were washed in 25° C. deionized water and dried after each cure cycle. The anodes were processed through a series of 8 such steps.

Carbon paint and silver were coated on the exterior of the anodized anodes. The coating material and conductive polymer were removed from the wire by laser cleaning. The tantalum wire was locally anodized in a phosphoric acid electrolyte to different voltage in four different groups of currents as listed in Table 1. The tantalum wire was welding to a positive termination and silver layer was connected to a negative termination by a conductive adhesive. The assembled body was encapsulated into epoxy resin to form a finished capacitor. The 220 µF, 6.3V capacitors were tested with biased HAST test at 121° C. and 85 RH % at 0.67 times of the rated voltage for 42 hours. The dielectric thickness was measured by SEM cross section and the conductivity was measured by a conductivity meter.

Comparative Example 2

Capacitors were prepared from the same anode lot as in Inventive Example 2 except no localized anodization was applied. The capacitors were tested with biased HAST test at 121° C. and 85 RH % at 0.67 times rated voltage for 42 hours. The cross-sectional thickness of the dielectric was measured by scanning electron microscopy (SEM) and the conductivity was measured by a conductivity meter. The results are presented in Table 1. In Table 1, LV is the Localization Anodization Voltage (V) and Current (mA/Anode), DT is dielectric thickness in nm, CON is conductivity of the conductive polymer on the wire in S/cm, and HAST is the biased HAST short circuit percentage.

TABLE 1

|  |  | LV | DT | CON | HAST |
|---|---|---|---|---|---|
| Inventive Example 2 | 1 | 18 V, 5 | 31 | 27 | 32 |
|  | 2 | 18 V, 5000 | 33 | 0.15 | 13 |
|  | 3 | 108 V, 5 | 164 | 1.32 | 4 |
|  | 4 | 108 V, 5000 | 195 | 0.047 | 0 |
| Comparative Example 2 | 1 | No | 3 | 34 | 50 |

The invention has been described with reference to the preferred embodiments without limit thereto. One of skill in the art would realize additional embodiments and improvements which are not specifically set forth herein but which are within the scope of the invention as more specifically set forth in the claims appended hereto.

The invention claimed is:

1. A capacitor comprising:
an anode;
a functional dielectric on said anode;
a conductive layer on said functional dielectric;
an anode wire extending from said anode wherein said anode wire has a thickened dielectric region thereon; and
wherein said thickened dielectric region has a thickness of at least 1.1-10.0 times the thickness of said functional dielectric.

2. The capacitor of claim 1 wherein said anode comprises a valve metal or a conductive oxide of a valve metal.

3. The capacitor of claim 2 wherein said anode comprises a valve metal selected from the group consisting of tantalum, aluminum, niobium, titanium, zirconium and hafnium.

4. The capacitor of claim 1 wherein said thickened dielectric region has a thickness of at least 2-8 times the thickness of said functional dielectric.

5. The capacitor of claim 1 wherein said functional dielectric is an oxide of said anode.

6. The capacitor of claim 1 wherein said conductive layer comprises a conductive polymer.

7. The capacitor of claim 6 wherein said conductive polymer is selected from the group consisting of polythiophene, polypyrrole and polyaniline.

8. The capacitor of claim 7 wherein said conductive polymer comprises polymerized 3,4-ethylenedioxythiophene.

9. The capacitor of claim 6 further comprising a blocking polymer on said thickened dielectric.

10. The capacitor of claim 9 wherein said blocking polymer has lower conductivity than said conductive polymer.

11. A method for forming a capacitor comprising:
pressing and sintering a metal to form an anode with an anode wire extending therefrom;
forming a functional dielectric on said anode;
forming a conductive layer on said functional dielectric;
forming a thickened dielectric region on said anode wire; and
cleaning said anode wire prior to said forming said thickened dielectric region.

12. The method for forming a capacitor of claim 11 further comprising applying a blocking polymer on said thickened dielectric.

13. The method for forming a capacitor of claim 12 wherein said blocking polymer has a lower conductivity than said conductive layer.

14. The method for forming a capacitor of claim 11 wherein said anode comprises a valve metal or a conductive oxide of a valve metal.

15. The method for forming a capacitor of claim 14 wherein said anode comprises a valve metal selected from the group consisting of tantalum, aluminum, niobium, titanium, zirconium and hafnium.

16. The method for forming a capacitor of claim 11 wherein said thickened dielectric region has a thickness of at least 1.1-10.0 times the thickness of said functional dielectric.

17. The method for forming a capacitor of claim 16 wherein said thickened dielectric region has a thickness of at least 2-8 times the thickness of said functional dielectric.

18. The method for forming a capacitor of claim 11 wherein said functional dielectric is an oxide of said anode.

19. The method for forming a capacitor of claim 11 wherein said conductive layer comprises a conductive polymer.

20. The method for forming a capacitor of claim 19 wherein said conductive polymer is selected from the group consisting of polythiophene, polypyrrole and polyaniline.

21. The method for forming a capacitor of claim 20 wherein said conductive polymer comprises polymerized 3,4-ethylenedioxythiophene.

22. The method for forming a capacitor of claim 11 further comprising a blocking polymer on said thickened dielectric.

23. The method for forming a capacitor of claim 22 wherein said blocking polymer has lower conductivity than said conductive polymer.

24. A method for forming a capacitor comprising:
pressing and sintering a metal to form an anode with an anode wire extending therefrom;
forming a functional dielectric on said anode;
forming a conductive layer on said functional dielectric; and
forming a thickened dielectric region on said anode wire wherein said forming of said thickened dielectric region comprises applying a forming electrolyte to said anode wire in the presence of applied voltage.

25. A method for forming a capacitor comprising:
pressing and sintering a metal to form an anode with an anode wire extending therefrom;
forming a functional dielectric on said anode;
forming a conductive layer on said functional dielectric; and
forming a thickened dielectric region on said anode wire by applying an applied voltage wherein said applied voltage is higher than a formation voltage.

26. A method for forming a capacitor comprising:
pressing and sintering a metal to form an anode with an anode wire extending therefrom;
forming a functional dielectric on said anode;
forming a conductive layer on said functional dielectric; and
forming a thickened dielectric region on said anode wire by applying a forming electrolyte wherein said applying of said forming electrolyte comprises a conductive nozzle.

27. The method for forming a capacitor of claim 26 wherein said conductive nozzle comprises a metal syringe.

28. The method for forming a capacitor of claim 24 wherein said applying said forming electrolyte comprises pressure.

* * * * *